(12) United States Patent
Li et al.

(10) Patent No.: US 11,289,748 B2
(45) Date of Patent: Mar. 29, 2022

(54) ELECTRODE PLATE, ELECTROCHEMICAL DEVICE AND SAFETY COATING

(71) Applicant: Contemporary Amperex Technology Co., Limited, Fujian (CN)

(72) Inventors: Zhenhua Li, Fujian (CN); Haizu Jin, Fujian (CN); Xing Li, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 160 days.

(21) Appl. No.: 16/138,451

(22) Filed: Sep. 21, 2018

(65) Prior Publication Data

US 2019/0140328 A1 May 9, 2019

(30) Foreign Application Priority Data

Nov. 8, 2017 (CN) .................. 201711091766.5

(51) Int. Cl.
*H01M 10/637* (2014.01)
*H01M 4/36* (2006.01)
(Continued)

(52) U.S. Cl.
CPC .......... *H01M 10/637* (2015.04); *H01C 7/021* (2013.01); *H01C 7/027* (2013.01);
(Continued)

(58) Field of Classification Search
CPC .. H01M 10/0525; H01M 10/637; H01M 4/36; H01M 4/366; H01M 4/62; H01M 4/623
See application file for complete search history.

(56) References Cited

U.S. PATENT DOCUMENTS 6,150,051 A    11/2000   Du Pasquier et al.
8,368,504 B1    2/2013   Chen et al.
(Continued)

FOREIGN PATENT DOCUMENTS

CN    102035039 A       4/2011
CN    102344598 A   *   2/2012   ............. B29C 48/92
(Continued)

OTHER PUBLICATIONS

Extended European Search Report for European Application No. 18196393.5, dated Mar. 15, 2019, 9 pages.
(Continued)

*Primary Examiner* — Karie O'Neill Apicella
(74) *Attorney, Agent, or Firm* — Law Offices of Liaoteng Wang

(57) ABSTRACT

This application relates to an electrode plate, an electrochemical device and a safety coating. The electrode plate comprises a current collector, an electrode active material layer and a safety coating disposed between the current collector and the electrode active material layer. The safety coating layer comprises fluorinated polyolefin and/or chlorinated polyolefin polymer matrix, a conductive material and an inorganic filler. The electrode plate can quickly cut off the circuit when the electrochemical device (for example, a capacitor, a primary battery, or a secondary battery) is in a high temperature condition or an internal short circuit occurs, and thus it may improve the high temperature safety performance of the electrochemical device.

13 Claims, 1 Drawing Sheet

(51) Int. Cl.
*H01M 4/62* (2006.01)
*H01M 10/0525* (2010.01)
*H01G 11/28* (2013.01)
*H01G 11/32* (2013.01)
*H01G 11/46* (2013.01)
*H01G 11/48* (2013.01)
*H01M 10/42* (2006.01)
*H01C 7/02* (2006.01)
*H01G 11/06* (2013.01)
*H01M 4/13* (2010.01)
*H01G 11/18* (2013.01)
*H01G 11/36* (2013.01)
*H01M 4/02* (2006.01)
*H01G 11/40* (2013.01)
*H01M 4/04* (2006.01)

(52) U.S. Cl.
CPC ............ *H01G 11/06* (2013.01); *H01G 11/18* (2013.01); *H01G 11/28* (2013.01); *H01G 11/32* (2013.01); *H01G 11/46* (2013.01); *H01G 11/48* (2013.01); *H01M 4/13* (2013.01); *H01M 4/366* (2013.01); *H01M 4/623* (2013.01); *H01M 4/625* (2013.01); *H01M 4/628* (2013.01); *H01M 10/0525* (2013.01); *H01M 10/4235* (2013.01); *H01G 11/36* (2013.01); *H01G 11/40* (2013.01); *H01M 4/0404* (2013.01); *H01M 2004/028* (2013.01); *H01M 2200/106* (2013.01)

(56) References Cited

U.S. PATENT DOCUMENTS

| | | |
|---|---|---|
| 2005/0079422 A1 | 4/2005 | Ko et al. |
| 2007/0035378 A1 | 2/2007 | Wang et al. |
| 2014/0178753 A1* | 6/2014 | Chu .................. H01M 10/4235 429/211 |
| 2016/0079582 A1* | 3/2016 | Takeuchi .............. H01M 10/05 429/144 |
| 2016/0233667 A1 | 8/2016 | Chen et al. |
| 2016/0240836 A1* | 8/2016 | Aotani ..................... H01M 4/13 |
| 2017/0309970 A1* | 10/2017 | Kim ........................ H01M 4/62 |

FOREIGN PATENT DOCUMENTS

| | | | | |
|---|---|---|---|---|
| CN | 102344598 A | | 2/2012 | |
| CN | 102646811 A | | 8/2012 | |
| CN | 203218375 U | | 9/2013 | |
| CN | 103904294 A | | 7/2014 | |
| CN | 104409681 A | * | 3/2015 | .............. H01M 4/04 |
| CN | 104409681 A | | 3/2015 | |
| CN | 104823313 A | | 8/2015 | |
| CN | 105470523 A | | 4/2016 | |
| CN | 105594019 A | | 5/2016 | |
| CN | 106024230 A | | 10/2016 | |
| CN | 106558676 A | | 4/2017 | |
| CN | 106981664 A | | 7/2017 | |
| CN | 206313005 U | | 7/2017 | |
| EP | 2874213 A1 | | 5/2015 | |
| JP | 2014207421 A | | 10/2014 | |

OTHER PUBLICATIONS

First Office Action and Search Report for Chinese Application No. 201711091766.5, dated May 15, 2020, 11 pages.
Second Office Action and Supplementary Search Report for Chinese Application No. 201711091766.5, dated Aug. 4, 2020, 10 pages.
Third Office Action and Supplementary Search Report for Chinese Application No. 201711091766.5, dated Sep. 14, 2020, 6 pages.
Jiangong Chen:"Study on the PTC safe electrode of lithium-ion batteries" China Master's Theses Full-text Database, Engineering Science and Technology II, 2014, No. 6, Jun. 15, 2014, 65 pages.

* cited by examiner

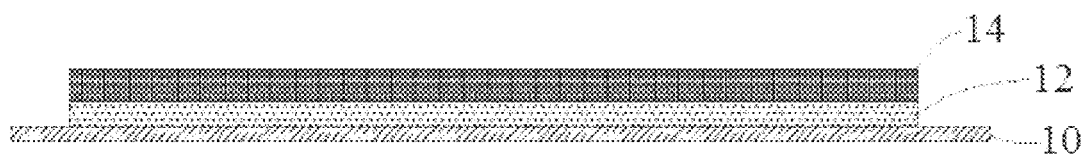

ELECTRODE PLATE, ELECTROCHEMICAL DEVICE AND SAFETY COATING

CROSS-REFERENCE TO RELATED APPLICATION

This application is based on and claims priority to Chinese Patent Application No. 201711091766.5 filed on Nov. 8, 2017, which is incorporated herein by reference in its entirety.

TECHNICAL FIELD

This application relates to the field of electrochemical technology, and more particularly, to an electrode plate and an electrochemical device containing the electrode plate.

BACKGROUND

Lithium-ion batteries are widely used in electric vehicles and consumer electronics because of their high energy density, high output power, long cycle life and small environmental pollution. However, lithium-ion batteries are prone to fire and explosion when subjected to abnormal conditions such as crushing, bumping or puncture, causing serious harm. Therefore, the safety problem of lithium-ion batteries greatly limits the application and popularity of lithium-ion batteries.

A large number of experimental results show that internal short circuit of lithium-ion battery is the basic cause of the battery's safety hazard. In order to avoid the internal short-circuit of the battery, researchers have tried to improve the battery in many ways, including the use of PTC materials to improve the safety performance of lithium-ion battery. A PTC (Positive Temperature Coefficient) material is a positive temperature coefficient heat sensitive material, which has the characteristic that its resistivity increases with increasing temperature. When the temperature exceeds a certain temperature, its resistivity increases rapidly in a stepwise manner.

In the study of utilizing the characteristics of PTC materials to improve the safety performance of lithium-ion battery, some studies involve addition of PTC materials to the electrode active material layer of the battery. When the temperature of the battery rises, the resistance of the PTC material increases, thereby causing the resistance of the entire electrode active material layer to become large, and even making the conductive path of the entire electrode active material layer to be destroyed. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when the active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer but also deteriorates its electrical properties. In addition, in the compacting step of the plate fabrication process, the PTC material layer is easily squeezed to the edge and thus the electrode active material layer would directly contact the current collector, so that the PTC material layer cannot improve the safety performance. In addition, it is required to greatly improve the performance of the PTC material layer, such as the response speed, the effect of blocking current, and the like.

In view of this, it is indeed necessary to provide an electrode plate and a battery having improved safety and battery performance (e.g., cycle performance), which are capable of solving the above problems.

SUMMARY

It is an object of this application to provide an electrode plate and an electrochemical device having improved safety or electrical performances such as cycle performance.

It is another object of this application to provide an electrode plate and an electrochemical device which have both good safety and electrical performances such as cycle performance.

It is a further object of this application to provide an electrode plate and an electrochemical device suitable for mass production and application with excellent performances such as good safety performance, improved electrical performance (e.g., cycle performance), and ease of processing.

This application provides an electrode plate comprising a current collector, an electrode active material layer and a safety coating disposed between the current collector and the electrode active material layer, wherein the safety coating comprises a polymer matrix, a conductive material and an inorganic filler in which the polymer matrix is fluorinated polyolefin and/or chlorinated polyolefin polymer matrix, wherein based on the total weight of the safety coating, the weight percentage of the polymer matrix is from 35 wt % to 75 wt %, preferably from 50 wt % to 75 wt %; the weight percentage of the conductive material is from 5 wt % to 25 wt %, preferably from 5 wt % to 15 wt %; and the weight percentage of the inorganic filler is from 10 wt % to 60 wt %, preferably from 15 wt % to 45 wt %. Preferably, the average particle diameter D of the inorganic filler is $100 \leq D \leq 10$ μm.

This application also provides an electrochemical device comprising the electrode plate of this application, which is preferably a capacitor, a primary battery or a secondary battery.

This application also provides a safety coating useful for an electrode plate, comprising: a polymer matrix, a conductive material and an inorganic filler, wherein the polymer matrix is fluorinated polyolefin and/or chlorinated polyolefin polymer matrix, and wherein based on the total weight of the safety coating, the weight percentage of the polymer matrix is from 35 wt % to 75 wt %, preferably from 50 wt % to 75 wt %; the weight percentage of the conductive material is from 5 wt % to 25 wt %, preferably from 5 wt % to 15 wt %; and the weight percentage of the inorganic filler is from 10 wt % to 60 wt %, preferably from 15 wt % to 45 wt %. Preferably, the average particle diameter D of the inorganic filler is 100 nm$\leq D \leq$10 μm.

DESCRIPTION OF THE DRAWINGS

The electrode plate, the electrochemical device and the beneficial effects of this application will be described in detail below with reference to the accompanying drawings and specific embodiments.

FIG. 1 is a schematic structural view of a positive electrode plate according to an embodiment of this application, in which 10—a current collector; 14—a positive active material layer; 12—a safety coating (i.e., PTC safety coating).

DETAILED DESCRIPTION

This application discloses an electrode plate comprising a current collector, an electrode active material layer and a safety coating disposed between the current collector and the electrode active material layer, wherein the safety coating comprises fluorinated polyolefin and/or chlorinated polyolefin polymer matrix, a conductive material, and an inorganic filler.

The electrode plate may be a positive electrode plate or a negative electrode plate, with the positive electrode plate being preferred because the positive electrode plate would have more prominent safety problem when the battery is used. Obviously, as a positive electrode plate, the electrode active material layer in the electrode plate of this application is a positive active material layer; and as a negative electrode plate, the electrode active material layer in the electrode plate of this application is a negative active material layer. FIG. 1 shows a schematic structural view of a positive electrode plate according to some embodiments of this application, in which 10—a current collector, 14—a positive active material layer, 12—a safety coating (i.e., PTC safety coating).

It is easy to understand that FIG. 1 only shows the embodiment in which the PTC safety coating 12 and the positive active material layer 14 are provided on one side of the positive electrode current collector 10, and the PTC safety coating 12 and the positive active material layer 14 may be disposed on both sides of the positive current collector 10 in other embodiments.

In this application, fluorinated polyolefin and/or chlorinated polyolefin as the polymer matrix of safety coating refers to polyvinylidene fluoride (PVDF), polyvinylidene chloride (PVDC), modified PVDF, or modified PVDC. For example, the fluorinated polyolefin and/or chlorinated polyolefin may be selected from the group consisting of PVDF, carboxylic acid modified PVDF, acrylic acid modified PVDF, PVDF copolymer, PVDC, carboxylic acid modified PVDC, acrylic acid modified PVDC, PVDC copolymer or any mixture thereof.

In the conventional coating having PTC effect for use in batteries, polyethylene, polypropylene or ethylene propylene copolymer or the like is generally used as the PTC matrix material, in which case it is necessary to additionally add a binder to the PTC matrix material and the conductive material. In the case of adding a binder, if the binder content is too small, the adhesion between the coating and the current collector is poor, and if the binder content is too large, the response temperature and response speed of the PTC effect are affected. Fluorinated polyolefin or chlorinated polyolefin (such as PVDF) is a common binder. When used as a binder, the amount of PVDF is much less than the amount of the matrix material. For example, the PVDF binder in conventional PTC coatings is typically present in an amount of less than 15% or 10%, or even less, relative to the total weight of the coating. Some patent applications such as CN105594019A and CN106558676A also mention that PVDF itself may be used as a PTC matrix material, but most of them are theoretical guesses, and the effect of PVDF as a PTC matrix material has not been actually verified. Meanwhile, other documents such as the description on paragraph [0071] of CN104823313A clearly state that PVDF is not suitable for use as a PTC matrix material.

In this application, the safety coating disposed between the current collector and the electrode active material layer can function as a PTC thermistor layer by using fluorinated polyolefin and/or chlorinated polyolefin as a polymer matrix material. The weight percentage of the fluorinated polyolefin and/or chlorinated polyolefin as the polymer matrix material is from 35 wt % to 75 wt %, relative to the total weight of the safety coating. The amount is much higher than the amount of fluorinated polyolefin or chlorinated polyolefin (e.g., PVDF) typically used as a binder in the prior PTC thermistor layers.

In this application, the fluorinated polyolefin and/or chlorinated polyolefin material actually functions, both as a PTC matrix and as a binder, which avoids the influence on the adhesion of the coating, the response speed, and the response temperature of the PTC effect due to the difference between the binder and the PTC matrix material.

Secondly, the safety coating composed of fluorinated polyolefin and/or chlorinated polyolefin material and a conductive material can function as a PTC thermistor layer and its operating temperature range is suitably from 80° C. to 160° C. Thus the high temperature safety performance of the battery may be improved well.

In addition, the fluorinated polyolefin and/or chlorinated polyolefin as a polymer matrix material of the safety coating serves as both a PTC matrix and a binder, thereby facilitating the preparation of a thinner safety coating without affecting the adhesion of the safety coating.

In addition, the solvent (such as NMP or the like) or the electrolyte in the electrode active material layer on the upper layer of the safety coating may have an adverse effect such as dissolution, swelling and the like on the polymer material of the safety coating. For the safety coating containing PVDF in a binder amount, the adhesion would be easy to be worse due to above effect. For the safety coating of the present application, the above adverse effect is negligible since the content of fluorinated polyolefin and/or chlorinated polyolefin is large.

In the electrode plate of this application, the weight percentage of the fluorinated polyolefin and/or chlorinated polyolefin polymer matrix is from 35 wt % to 75 wt %, based on the total weight of the safety coating. If the content is too small, the polymer matrix cannot ensure the safety coating works well in terms of its PTC effect; and if the content is too high, the content of the conductive material and the inorganic filler is too small, which also affects the response speed of the safety coating. The weight percentage of the fluorinated polyolefin and/or chlorinated polyolefin polymer matrix is preferably from 40 wt % to 75 wt %, more preferably from 50 wt % to 75 wt %.

In this application, the safety coating disposed between the current collector and the electrode active material layer further comprises a conductive material. The conductive material may be selected from at least one of a conductive carbon-based material, a conductive metal material, and a conductive polymer material, wherein the conductive carbon-based material is selected from at least one of conductive carbon black, acetylene black, graphite, graphene, carbon nanotubes, carbon nanofibers; the conductive metal material is selected from at least one of Al powder, Ni powder, and gold powder; and the conductive polymer material is selected from at least one of conductive polythiophene, conductive polypyrrole, and conductive polyaniline. The conductive materials may be used alone or in combination of two or more.

The safety coating of this application works as below. At a normal temperature, the safety coating relies on a good conductive network formed between the conductive materials to conduct electron conduction. When the temperature rises, the volume of the polymer matrix material begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero, thereby protecting the electrochemical device that uses the safety coating. Therefore, the amount of conductive material plays a key role in the effect of the PTC layer. In this application, the conductive material is present in a weight percentage of 5 wt % to 25 wt %, preferably 5 wt % to 15 wt %, based on the total weight of the safety coating.

Conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

In this application, the safety coating disposed between the current collector and the electrode active material layer further comprises an inorganic filler. It has been found that when the safety coating is free of an inorganic filler, the solvent (such as NMP or the like) or the electrolyte of the electrode active material layer disposed on the safety coating may have an adverse effect such as dissolution, swelling, and the like on the polymer material of the safety coating, so that the safety coating will be destroyed, and thus the PTC effect is affected. The inventors have found that after the inorganic filler is added to the safety coating, the inorganic filler acts as a barrier substance, which facilitates the elimination of the above-mentioned adverse effects such as dissolution and swelling, and is advantageous for stabilizing the safety coating. In addition, it has also been found that the addition of the inorganic filler is also advantageous for ensuring that the safety coating is not easily deformed during the plate compaction process. Therefore, the addition of the inorganic filler can guarantee that the safety coating is stably disposed between the current collector and the electrode active material layer, and prevent the current collector from directly contacting the electrode active material layer, thereby improving the safety performance of the battery.

The inventors have also unexpectedly discovered that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero. However, usually the conductive network is partially recovered, when the inside of the safety coating reaches a dynamic balance. Therefore, after reaching a certain temperature for example the operating temperature, the resistance of the safety coating is not as large as expected, and still there is very little current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can better produce the PTC effect in the operating temperature range. That is to say, the increasing speed of the resistance is faster and the PTC response speed is faster at a high temperature. Thus, the safety performance of the battery can be improved better.

The inorganic filler is present in a weight percentage of 10 wt % to 60 wt % based on the total weight of the safety coating. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

The inorganic filler can function as stabilizing the safety coating from the following two aspects: (1) hindering the electrolyte and the solvent (such as NMP, etc.) of the electrode active material layer from dissolving or swelling the polymer material of the safety coating; and (2) guaranteeing that the safety coating is not easily deformed during the plate compaction process.

The inorganic filler is selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, lithium titanate, or at least one of a conductive carbon coating modified above material, a conductive metal coating modified above material or a conductive polymer coating modified above material.

The inventors have found that when the safety coating of this application is used for a positive electrode plate, the use of a positive electrode electrochemically active material or conductive carbon coating modified material, conductive metal coating modified material, or conductive polymer coating modified material of the positive electrode electrochemically active material as inorganic fillers has a particular advantage. In this case, in addition to above mentioned function as stabilizing the safety coating (i.e. hindering the organic solvent from dissolving or swelling the polymer material of the safety coating and ensuring that the safety coating is not easily deformed) and as improving the performance such as the response speed and the like of the safety coating. In particularly, the positive electrode electrochemically active material used as the inorganic filler may further play the following two roles: (1) to improve the overcharge performance of the battery. In the PTC safety coating system composed of fluorinated polyolefin and/or chlorinated polyolefin polymer matrix and a conductive material, since the electrochemically active material has the characteristics of lithium ion intercalation, the electrochemically active material can be used as an "active site" in the conductive network at the normal operating temperature of the battery and thus the number of "active site" in the safety coating is increased. In the process of overcharging, the electrochemically active material willdelithiate, and the delithiation process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem of battery occurs. Thus the battery overcharge safety performance may be improved; (2) to contribute charge and discharge capacity. Since the electrochemically active material can contribute a certain charge and discharge capacity at the normal operating temperature of the battery, the effect of the safety coating on the electrochemical performance such as capacity of the battery at the normal operating temperature can be dropped to the lowest.

A particularly preferred positive electrode electrochemically active material suitable for such use is at least one selected from the group consisting of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganese oxide, spinel lithium nickel manganese oxide, and lithium titanate. Particularly a conductive carbon coating modified above electrochemically active material is preferred, such as conductive carbon coating modified lithium cobalt oxide, conductive carbon coating modified lithium nickel manganese cobalt oxide, conductive carbon coating modified lithium nickel manganese aluminum oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These electrochemically active materials and conductive carbon coating modified electrochemically active materials are commonly used materials in the manufacture of lithium batteries, most of which are commercially available, wherein the type of conductive carbon may be graphite, graphene, conductive carbon black, carbon nanotubes or the like. Further, the conductivity of the inorganic filler can be adjusted by adjusting the content of the conductive carbon coating.

As a further improvement of this application, the average particle diameter D of the particles of the inorganic filler is 100 nm≤D≤100 μm, and preferably 1 μm≤D≤6 μm. As described above, the inorganic filler can stabilize the safety coating by hindering the organic solvent (such as NMP, electrolyte, etc.) from causing adverse effects such as dissolution and swelling of the polymer material and ensuring that the safety coating is not easily deformed. In order to exert the above effect, the particle size of the inorganic filler has a preferable range. The inventors have found that when the particle size of the inorganic filler is too small, the specific surface area increases, and the side reaction increases; when the particle size is too large, the coating thickness of the safety coating is too large and the thickness is not uniform. After a large number of experiments, it was found that the inorganic filler preferably has an average particle diameter D of 100 nm≤D≤10 μm, and preferably 1 μm≤D≤6 μm. In addition, when the particle diameter of the inorganic filler is in the above range, the effect of blocking the conductive network by the inorganic particles at a high temperature can also be improved, thereby improving the performance such as the response speed of the safety coating.

In addition to the polymer matrix, conductive material, and inorganic filler, the safety coating employed in this application may also include other materials or components, such as binder for promoting the adhesion between the coating and the substrate as the current collector, and the like. Those skilled in the art can select other additives according to actual needs.

Since the polymer matrix material used in the safety coating of this application has good adhesion itself, in some embodiments of this application, the security coating is substantially free of other binder than the polymer matrix material. ("substantially free" means that the content is ≤3%, ≤1%, or ≤0.5%). In some embodiments of this application, the safety coating is substantially free of aqueous binders (e.g., CMC, polyacrylate, polycarbonate, polyethylene oxide, rubber, polyurethane, sodium carboxymethyl cellulose, polyacrylic acid, acrylonitrile multipolymers, gelatin, chitosan, sodium alginate, coupling agents, cyanoacrylates, polymeric cyclic ether derivatives, hydroxyl derivatives of cyclodextrins, etc.).

In some embodiments, the safety coating of this application may consist essentially of the polymer matrix, the conductive material, and the inorganic filler, i.e., it does not contain a significant amount (e.g., a content of ≤3%, ≤1%, or ≤0.5%) of other components.

Those skilled in the art will appreciate that various defined or preferred range for the selected component, the component content, and the physicochemical property parameters of the safety coating in above mentioned various embodiments of this application, may be combined arbitrarily and the combined embodiments are still within the scope of the invention and are considered as part of the disclosure.

In this application, the coating thickness H of the safety coating is not more than 40 μm, preferably not more than 25 μm, more preferably not more than 20 μm, 15 μm or 10 μm. The coating thickness of the safety coating is greater than or equal to 1 μm, preferably greater than or equal to 2 μm, and more preferably greater than or equal to 3 μm. If the thickness is too small, it is not enough to ensure that the safety coating can improve the safety performance of the battery; if it is too large, the internal resistance of the battery will increase seriously, which will affect the electrochemical performance of the battery during normal operation.

In the electrode plate of this application, a safety coating is applied over the electrode current collector. For the current collector, materials commonly used in the art, for example metal flakes or metal foils such as stainless steel, aluminum, copper, titanium, etc., can be used.

In the electrode plate of this application, an electrode active material layer is provided outside the safety coating. For the positive electrode plate, a positive active material layer is used; and for the negative electrode plate, a negative active material layer is used.

As the positive electrode active material layer used in this application, various positive electrode active material layers suitable for use in a lithium battery known in the art can be selected, and the constitution and preparation method thereof are well known in the art. The positive electrode active material layer contains a positive electrode active material, and various positive electrode active materials for preparing a lithium-ion secondary battery positive electrode known to those skilled in the art may be used. For example, the positive electrode active material is a lithium-containing composite metal oxide, for example one or more of $LiCoO_2$, $LiNiO_2$, $LiMn_2O_4$, $LiFePO_4$, lithium nickel cobalt manganese oxide (such as $LiNi_{0.5}Co_{0.2}Mn_{0.3}O_2$) and one or more of lithium nickel manganese oxide.

When a positive electrode electrochemically active material or a coating modified positive electrode electrochemically active material is used as an inorganic filler for a safety coating of a positive electrode plate, the positive electrode electrochemically active material in the safety coating layer and the positive electrode active material in the positive electrode active materials layer may be the same or different.

The negative electrode active material layer used in this application may be selected from various negative electrode active material layers suitable for use in lithium batteries known in the art, and the constitution and preparation method thereof are well known in the art. The negative electrode active material layer contains a negative electrode active material, and various negative electrode active materials for preparing a lithium-ion secondary battery negative electrode known to those skilled in the art may be used, for example, a carbonaceous material such as graphite (artificial graphite or natural graphite), conductive carbon black or carbon fiber and the like, a metal or a semimetal material such as Si, Sn, Ge, Bi, Sn, or In or an alloy thereof, a lithium-containing nitride or a lithium-containing oxide, a lithium metal or a lithium aluminum alloy.

The present application also discloses an electrochemical device comprising the electrode plate according to this application. The electrochemical device may be a capacitor, a primary battery, or a secondary battery. For example, it may be a lithium-ion capacitor, a lithium-ion primary battery, or a lithium-ion secondary battery. In addition to the use of the electrode plate (positive electrode plate and/or negative electrode plate) of this application, the construction and preparation methods of these electrochemical devices are known per se. The electrochemical device can have improved safety and electrical performances (e.g., cycle performance) due to the use of the electrode plate of this application. Further, since the electrode plate of this application is easy to manufacture, the manufacturing cost of the electrochemical device can be reduced due to use of the electrode plate of this application.

DETAILED DESCRIPTION

In order to make the objects, the technical solutions and the beneficial technical effects of this application more clear, this application will be described in further detail below with reference to the embodiments. However, it is to be understood that the embodiments of this application are not intended to limit the invention, and the embodiments of the invention are not limited to the embodiments set forth herein. The experimental conditions not indicated in the examples may refer to conventional conditions, or the conditions recommended by the material supplier or equipment supplier 1. Preparation Process 1.1 Preparation of Safety Coating A certain ratio of polymer matrix material, conductive material, and inorganic filler were evenly mixed with N-methyl-2-pyrrolidone (NMP) as a solvent and the resulting mixture was coated on a current collector, such as a positive current collector aluminum foil or a negative current collector copper foil. After drying, a PTC layer, i.e., the safety coating, was obtained.

The main materials used in the safety coating of the specific examples were as follows:

Polymer matrix materials: PVDF, PVDC;

Conductive material (conductive agent): Super-P (Swiss TIMCAL company, referred to as SP);

Inorganic fillers: lithium iron phosphate (abbreviated as LFP) and alumina.

The above materials are commonly used materials in the lithium battery industry and can be available commercially by the corresponding suppliers.

1.2 Preparation of Positive and Negative Electrode Plates with Safety Coating

Positive electrode plate was prepared as follows. 90 wt % ternary material NCM811 ($LiNi_{0.8}Co_{0.1}Mn_{0.1}O_2$), 5 wt % SP and 5 wt % PVDF were mixed evenly with NMP as a solvent, and then the resulting mixture was applied to the safety coating on the surface of the positive cathode current collector aluminum foil as prepared according to the above 1.1, as a positive active material layer. After drying at 85° C., the positive active material layer was cold pressed, then trimmed, cut, slit, and dried under vacuum at 85° C. for 4 hours. After welding, a positive electrode plate (i.e., a cathode plate) of a secondary battery that satisfies the requirements was obtained.

Negative electrode plate was prepared as follows. Active material graphite, conductive agent Super-P, thickener CMC, adhesive SBR were added to deionized water as solvent at a mass ratio of 96.5:1.0:1.0:1.5 to form an anode slurry. The slurry was applied to the safety coating on the surface of the negative current collector copper foil prepared according to the above 1.1, as a negative active material layer. After drying at 85° C., the negative active material layer was dried, then trimmed, cut, slit, and dried under vacuum at 110° C. for 4 hours. After welding, a negative electrode plate (i.e., an anode plate) of a secondary battery that satisfies the requirements was obtained.

1.3 Preparation of Conventional Positive Electrode Plate and Conventional Negative Electrode Plate Conventional positive electrode plate, hereinafter referred as "CPlate P", was prepared the same as the preparation method of 1.2 except that there is no safety coating on the surface of the positive electrode current collector aluminum foil.

Conventional negative electrode plate, hereinafter referred as "CPlate N", was prepared the same as the preparation method of 1.2 except that there is no safety coating on the surface of the negative electrode current collector aluminum copper foil.

1.4 Preparation of Electrolyte

The electrolyte was prepared as follows. Ethylene carbonate (EC), ethyl methyl carbonate (EMC), and diethyl carbonate (DEC) were mixed in a volume ratio of 3:5:2 to obtain an EC/EMC/DEC mixed solvent. And then, a sufficiently dried lithium salt LiPF6 was dissolved into the mixed solvent to obtain a solution having a concentration of 1 M, i.e. the electrolyte.

1.5 Preparation of Battery

A polypropylene film with 12 μm thickness was used as a separator and the positive electrode, the separator and the negative electrode were stacked in order, so that the separator was sandwiched in between the positive electrode and the negative electrode, and then the stack was wound into a bare battery core. After vacuum baking at 75° C. for 10 h, the electrolyte (prepared as described in "1.4 Preparation of electrolyte" above) was injected therein followed by vacuum-packing, and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charge and discharge processes were repeated twice. Finally, the battery core was charged to 3.8V with a constant current of 0.1 C, thereby completing the preparation of the secondary battery.

2. Tests for Material Performances

In each of the examples and comparative examples, unless otherwise specified, the physical properties of various materials (mainly inorganic fillers) constituting the safety coating were tested by the following test methods, respectively.

2.1 Particle Size

The power sample was dispersed in a dispersion medium (distilled water), which was measured with a Malvern laser particle size analyzer MS2000 for 5 times and averaged in unit of μm.

3. Tests for Battery Performances

The safety performances of the secondary batteries of various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charge cut-off voltage with a current of 1 C, and then charged with a constant voltage until the current dropped to 0.05 C. After that, charging was terminated. A high temperature resistant steel needle of φ5-10 mm which tip has a cone angle of 45° was used to puncture the battery plate at a speed of 25 mm/s in the direction perpendicular to the battery plate. The puncture position should be close to the geometric center of the surface to be punctured, the steel needle stayed in the battery, and then observe if the battery has an indication of burning or exploding.

3.2 Overcharge Test:

The secondary battery was fully charged to the charge cut-off voltage with a current of 1 C, and then charged with a constant voltage until the current dropped to 0.05 C. After that, charging was terminated. Then, after charging with a constant current of 1 C to reach 1.5 times the charging termination voltage or after charging for 1 hour, the charging was terminated.

3.3 Cycle Performance Test:

The test conditions of the cycle number were as follows: the secondary battery was subjected to a 1 C/1 C cycle test at 25° C. in which the charge and discharge voltage range was 2.8 to 4.2 V. The test was terminated when the capacity was attenuated to 80% of the first discharge specific capacity.

3.4 PTC Effect Test

The secondary battery was fully charged to the charge cut-off voltage with a current of 1 C, and then charged with a constant voltage until the current was reduced to 0.05 C. After that, the charging was terminated and the DC resistance of the battery was tested (4 C current discharge for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

4. Test Results 4.1 Protective Effect (PTC Effect) of Safety Coating and Effect of the Safety Coating on Battery Performances In order to verify the protective effect of this application, the corresponding safety coating, positive electrode plate, negative electrode plate and battery were prepared with the specific materials and amounts listed in Table 1-1 below according to the methods and procedures described in "1. Preparation of safety coating", and were tested according to the method specified in "Tests for battery performances". In order to ensure accuracy of data, 4 samples were prepared for each battery (10 samples for the puncture test) and tested independently. The final test results were averaged and shown in Table 1-2 and Table 1-3.

In the test, the conventional electrode CPlate P and the conventional electrode CPlate N were prepared with the method of "1.3 Preparation of conventional positive electrode plate and conventional negative electrode plate"; the other electrode plates, hereinafter abbreviate as Plate ** were prepared with the method of "1.2 Preparation of positive electrode plate and negative electrode plate with safety coating" in which the safety coating material was specified in the following table.

TABLE 1-1

| | | | Compositions of electrode plates | | | | | | |
|---|---|---|---|---|---|---|---|---|---|
| | | | | Composition of safety coating | | | | | |
| | Active electrode | materials | Polymer matrix material | wt % | Conductive materials material | wt % | Inorganic fillers material | wt % | Thickness H (μm) |
| CPlate P | P | NCM811 | / | / | / | / | / | / | / |
| CPlate P | N | Graphite | / | / | / | / | / | / | / |
| Plate CP | P | NCM811 | PVDF | 90 | SP | 10 | / | / | 20 |
| Plate 1 | P | NCM811 | PVDC | 35 | SP | 10 | Alumina | 55 | 10 |
| Plate 2 | P | NCM811 | PVDF | 35 | SP | 10 | LFP | 55 | 3 |
| Plate 3 | N | Graphite | PVDF | 35 | SP | 10 | Alumina | 55 | 20 |

Note:
in this application, Plate CP refers to a plate for control.

TABLE 1-2 performances of lithium-ion batteries

| Battery No. | Positive | Negative | Puncture Test |
|---|---|---|---|
| B1 | CPlate P | CPlate N | 10 fail |
| B2 | Plate CP | CPlate N | 2 pass and 8 fail |
| B3 | Plate 1 | CPlate N | 10 pass |
| B4 | Plate 2 | CPlate N | 10 pass |
| B5 | CPlate P | Plate 3 | 10 pass |

TABLE 1-3 performances of lithium-ion batteries

| Battery No. | Positive | Negative | DC resistance growth rate@130° C., 1 h | DC resistance growth rate@130° C., 2 h |
|---|---|---|---|---|
| B2 | Plate CP | CPlate N | 20% | 30% |
| B4 | Plate 2 | CPlate N | 1200% | 1500% |
| B5 | CPlate P | Plate 3 | 1000% | 1100% |

The data of Table 1-1, Table 1-2 and Table 1-3 demonstrated that the electrode plate of this application could greatly improve the needle-puncture performance of the battery, and the addition of the inorganic filler could significantly improve the DC resistance growth rate of the battery at high temperature, thereby improving the pass rate of the battery needle puncture test.

4.2 Effect of Component Content in Safety Coating

In order to study the effect of component content in safety coating, the corresponding safety coating, positive electrode plate, negative electrode plate and battery were prepared with the specific materials and amounts listed in Table 2-1 below according to the methods and procedures described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged and shown in Table 2-2.

TABLE 2-2 performances of lithium-ion batteries

| Battery No. | Positive | Negative | Puncture Test | Cycle Life |
|---|---|---|---|---|
| B6 | Plate CP 2-1 | CPlate N | 5 fail, 5 pass | 2502 |
| B7 | Plate 2-2 | CPlate N | 10 pass | 2351 |
| B8 | Plate 2-3 | CPlate N | 10 pass | 2205 |
| B9 | Plate 2-4 | CPlate N | 10 pass | 2251 |
| B10 | Plate 2-5 | CPlate N | 10 pass | 2000 |
| B11 | Plate 2-6 | CPlate N | 10 pass | 2408 |
| B12 | Plate 2-7 | CPlate N | 10 pass | 2707 |
| B13 | Plate 2-8 | CPlate N | 10 pass | 2355 |
| B14 | Plate 2-9 | CPlate N | 10 pass | 1800 |
| B15 | Plate CP 2-10 | CPlate N | 4 fail, 6 pass | 1715 |

The data in Table 2-1 and Table 2-2 demonstrated that: (1) if the content of inorganic filler was too low, the PTC effect of the safety coating could not be fully exerted, so the safety performance of the battery could not be fully improved; and if the content of inorganic filler was too high, the content of the polymer matrix was too low and the PTC effect of the safety coating could not be exerted effectively either. (2) The conductive material had a great influence on the internal resistance and polarization of the battery, thus affecting the cycle life of the battery. The higher the content of the conductive material was, the smaller the internal resistance and polarization of the battery were, and the better the cycle life was.

After carrying out experiments, it was found that the suitable content range of each component of the safety coating was as follows: the weight percentage of the polymer matrix was from 35 wt % to 75 wt %; the weight percentage of the conductive material was from 5 wt % to 25 wt %; and the weight percentage of the inorganic filler was from 10% by weight to 60% by weight.

4.3 Effect of Inorganic Filler on Battery Performances

In order to further study the effect of the property of material in the safety coating on the plate and battery performances, the corresponding safety coating, positive electrode plate, negative electrode plate and battery were prepared with the specific materials and amounts listed in Table 3-1 below according to the methods and procedures

TABLE 2-1

Compositions of electrode plate

| | | Composition of safety coating | | | | | | |
|---|---|---|---|---|---|---|---|---|
| | Active electrode materials | Polymer matrix material | wt % | Conductive materials material | wt % | Inorganic fillers material | wt % | Thickness H μm |
| Plate CP 2-1 | P | NCM811 | PVDF | 75 | SP | 20 | Alumina | 5 | 8 |
| Plate 2-2 | P | NCM811 | PVDF | 75 | SP | 15 | Alumina | 10 | 8 |
| Plate 2-3 | P | NCM811 | PVDF | 75 | SP | 10 | Alumina | 15 | 8 |
| Plate 2-4 | P | NCM811 | PVDF | 60 | SP | 10 | Alumina | 30 | 8 |
| Plate 2-5 | P | NCM811 | PVDF | 60 | SP | 8 | Alumina | 32 | 8 |
| Plate 2-6 | P | NCM811 | PVDF | 55 | SP | 15 | Alumina | 30 | 8 |
| Plate 2-7 | P | NCM811 | PVDF | 50 | SP | 25 | Alumina | 25 | 8 |
| Plate 2-8 | P | NCM811 | PVDF | 40 | SP | 15 | Alumina | 45 | 8 |
| Plate 2-9 | P | NCM811 | PVDF | 35 | SP | 5 | Alumina | 60 | 8 |
| Plate CP 2-10 | P | NCM811 | PVDF | 25 | SP | 5 | Alumina | 70 | 8 | described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged which were shown in Table 3-2.

TABLE 3-1

Compositions of electrode plate and material's property

| | | Composition of safety coating and material's property | | | | | | |
|---|---|---|---|---|---|---|---|---|
| | Active | Polymer matrix | | Conductive materials | | Inorganic fillers | | Thickness H |
| electrode | materials | material | wt % | material | wt % | material | wt % | Average particle size D | (μm) |
| Plate 2-11 | P | NCM811 | PVDF | 60 | SP | 10 | alumina | 30 | 100 nm | 8 |
| Plate 2-12 | P | NCM811 | PVDF | 60 | SP | 10 | alumina | 30 | 1 μm | 8 |
| Plate 2-13 | P | NCM811 | PVDF | 60 | SP | 10 | alumina | 30 | 3 μm | 8 |
| Plate 2-14 | P | NCM811 | PVDF | 60 | SP | 10 | alumina | 30 | 6 μm | 8 |
| Plate 2-15 | P | NCM811 | PVDF | 60 | SP | 10 | alumina | 30 | 8 μm | 8 |
| Plate 2-16 | P | NCM811 | PVDF | 60 | SP | 10 | alumina | 30 | 10 μm | 8 |

TABLE 3-2 performance result of lithium-ion battery

| Battery No. | Positive | Negative | Puncture Test | DC resistance growth rate@ 130 C., 1 h |
|---|---|---|---|---|
| B22 | Plate 2-11 | CPlate N | 10 pass | 300% |
| B23 | Plate 2-12 | CPlate N | 10 pass | 800% |
| B24 | Plate 2-13 | CPlate N | 10 pass | 1000% |
| B25 | Plate 2-14 | CPlate N | 10 pass | 1200% |
| B26 | Plate 2-15 | CPlate N | 10 pass | 1150% |
| B27 | Plate 2-16 | CPlate N | 10 pass | 1180% |

The data in Table 3-1 and Table 3-2 demonstrated that the particle size of the inorganic filler had an effect on the PTC response speed of the safety coating. The larger the particle size was, the greater the PTC response speed would be. In above tested range of 100 nm≤D≤10 μm, the battery exhibited a good PTC effect, and the electrical performance such as cycle performance also was improved. When the particle size of the inorganic filler is too small or too large, it may adversely affect the electrical properties of the battery or the production process. Therefore, the particle diameter D of the inorganic filler is preferably 100 nm≤D≤10 μm.

It will be understood by those skilled in the art that the above application examples of the safety coating of this application are only exemplified to be used for a lithium battery, but the safety coating of this application can also be applied to other types of batteries or electrochemical devices, and still may produce good technical effect of this application. It will be understood by those skilled in the art that in a battery or an electrochemical device, the safety coating of this application can be used for a positive electrode plate, a negative electrode plate, or both a positive electrode plate and a negative electrode plate, both of which can function as an effective protective effect.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

The invention claimed is:

1. An electrode plate comprising a current collector, an electrode active material layer and a safety coating disposed between the current collector and the electrode active material layer, wherein the safety coating consists essentially of a polymer matrix, a conductive material and an inorganic filler, wherein the polymer matrix is fluorinated polyolefin and/or chlorinated polyolefin polymer matrix, wherein based on the total weight of the safety coating, the weight percentage of the polymer matrix is from 35 wt % to 75 wt %; the weight percentage of the conductive material is from 5 wt % to 25 wt %; and the weight percentage of the inorganic filler is from 10 wt % to 60 wt %; and the average particle diameter D of the inorganic filler is 100 nm≤D≤10 μm; and wherein the inorganic filler is selected from at least one of lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, lithium titanate, or at least one of a conductive carbon coating modified above material or a conductive metal coating modified above material.

2. The electrode plate according to claim 1, wherein the polymer matrix is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymer and PVDC copolymer.

3. The electrode plate according to claim 1, wherein the conductive material is selected from at least one of a conductive carbon-based material, a conductive metal material, and a conductive polymer material,
  wherein the conductive carbon-based material is selected from at least one of conductive carbon black, acetylene black, graphite, graphene, carbon nanotubes, carbon nanofibers;
  the conductive metal material is selected from at least one of Al powder, Ni powder, and gold powder; and
  the conductive polymer material is selected from at least one of conductive polythiophene, conductive polypyrrole, and conductive polyaniline.

4. The electrode plate according to claim 1, wherein the safety coating has a thickness H of 1 µm≤H≤20 µm.

5. The electrode plate according to claim 1, wherein the safety coating has a thickness H of 3 µm≤H≤10 µm.

6. The electrode plate according to claim 1, wherein the weight percentage of the polymer matrix is from 50 wt % to 75 wt %; the weight percentage of the conductive material is from 5 wt % to 15 wt %; and the weight percentage of the inorganic filler is from 15 wt % to 45 wt %.

7. The electrode plate according to claim 1, wherein the average particle diameter D of the inorganic filler is 1 µm≤D≤6 µm.

8. The electrode plate according to claim 1, wherein the plate is a positive electrode plate.

9. An electrochemical device comprising a positive electrode plate and a negative electrode plate, wherein the positive electrode plate and/or the negative electrode plate is the electrode plate according to claim 1, and the electrochemical device is a capacitor, a primary battery or a secondary battery.

10. A safety coating for an electrode plate, consisting essentially of: a polymer matrix, a conductive material and an inorganic filler, wherein the polymer matrix is fluorinated polyolefin and/or chlorinated polyolefin polymer matrix, and wherein based on the total weight of the safety coating, the weight percentage of the polymer matrix is from 35 wt % to 75 wt %; the weight percentage of the conductive material is from 5 wt % to 25 wt %; and the weight percentage of the inorganic filler is from 10 wt % to 60 wt %; the average particle diameter D of the inorganic filler is 100 nm≤D≤10 µm.

11. The security coating for an electrode plate according to claim 10, wherein the weight percentage of the polymer matrix is from 50 wt % to 75 wt %; the weight percentage of the conductive material is from 5 wt % to 15 wt %; and the weight percentage of the inorganic filler is from 15 wt % to 45 wt %.

12. The safety coating for an electrode plate according to claim 10, wherein the inorganic filler has an average particle diameter D of 1 µm≤D≤6 µm.

13. The safety coating for an electrode plate according to claim 11, wherein the inorganic filler has an average particle diameter D of 1 µm≤D≤6 µm.

* * * * *